United States Patent [19]
Okada et al.

[11] Patent Number: 5,260,824
[45] Date of Patent: Nov. 9, 1993

[54] ATOMIC FORCE MICROSCOPE

[75] Inventors: Takao Okada; Shuzo Mishima; Tsugiko Takase; Hirofumi Miyamoto; Hiroko Ohta; Yasushi Satoh, all of Hachioji; Yoshimitsu Enomoto, Tokyo; Toshiaki Matsuzawa; Yuzo Nakamura, both of Hachioji; Hiroshi Kajimura, Tokyo, all of Japan

[73] Assignee: Olympus Optical Co., Ltd., Tokyo, Japan

[21] Appl. No.: 511,054

[22] Filed: Apr. 19, 1990

[30] Foreign Application Priority Data

Apr. 24, 1989 [JP] Japan .................. 1-104028
Aug. 10, 1989 [JP] Japan .................. 1-207738
Sep. 16, 1989 [JP] Japan .................. 1-240310

[51] Int. Cl.⁵ .................. G02B 4/00; G01B 5/28; G01N 23/00
[52] U.S. Cl. .................. 359/368; 250/306; 73/105
[58] Field of Search .................. 350/500, 507, 512, 515, 350/529-536; 250/442.1, 492.2, 492.3, 560, 305-311, 423 R-423 F, 440.1-443.1; 324/158 P; 73/105; 359/368, 369, 385

[56] References Cited

U.S. PATENT DOCUMENTS

| Re. 33,387 | 10/1990 | Binnig | 250/307 |
|---|---|---|---|
| 4,724,318 | 2/1988 | Binnig | 250/306 |
| 4,806,755 | 2/1989 | Duerig et al. | 250/306 |
| 4,837,435 | 6/1989 | Sakuhara et al. | 250/306 |
| 4,914,293 | 4/1990 | Hayashi et al. | 250/306 |
| 4,943,719 | 7/1990 | Akamine et al. | 250/306 |
| 4,985,627 | 1/1991 | Gutierrez et al. | 250/306 |
| 4,999,495 | 3/1991 | Miyata et al. | 250/306 |
| 5,041,783 | 8/1991 | Ohta et al. | 324/158 P |

FOREIGN PATENT DOCUMENTS

| 0290648A1 | 11/1988 | European Pat. Off. . |
|---|---|---|
| 0387906 | 9/1990 | European Pat. Off. . |
| 62-130302 | 6/1987 | Japan . |
| 1-56408 | 3/1989 | Japan . |
| WO89/01603 | 2/1989 | World Int. Prop. O. . |

OTHER PUBLICATIONS

"Atomic Resolution Imaging of a Nonconductor by Atomic Force Microscopy" Albrecht et al, J. Appl. Phys. 62(7), 1 Oct. 1987, pp. 2599-2602.

"Atomic Force Microscopy: General Aspects and Application to Insulators" Heinzelmann et al, J. Vac. Sci. Technol. A6(2) Mar./Apr. 1988, pp. 275-278.

"Atomic Force Microscopy: General Principals and a New Implementation" McClelland et al, Quantitative Non-Destructive Evaluation, vol. 6, New York (1987) pp. 1-8.

Journal of Applied Physics, vol. 61, No. 10, May 15, 1987; New York, pp. 4723-4729. Y. Martin et al "Atomic Force Microscope-Force Mapping and Profiling on a Sub 100 A Scale".

IBM Technical Disclosure Bulletin, vol. 30, No. 5, Oct. 1, 1987; New York, pp. 369-370; "Optically Transparent Tip for Tunneling Microscope".

Review of Scientific Instruments, vol. 59, No. 11, Nov. 1, 1988; New York, pp. 2337-2340; D. Ruger et al; "Force Microscope Using a Fiber Optic Displacement Sensor".

G. Binnig et al, "Atomic Force Microscope" Mar. 3, 1986, pp. 930-933, vol. 56, No. 9, Physical Review Letters.

Primary Examiner—Bruce Y. Arnold
Assistant Examiner—Thong Nguyen
Attorney, Agent, or Firm—Frishauf, Holtz, Goodman & Woodward

[57] ABSTRACT

An atomic force microscope comprises a probe having a sharply-pointed tip end. The probe is supported on the free end portion of a cantilever and is close to the surface of a specimen. When an interatomic force is produced, the cantilever is deformed, and the probe is displaced. The displacement of the probe is detected by an optical system. A light beam emitted from a light source is collimated by a lens, and reflected by a polarized beam-splitter, and also by a half-mirror. Then, the light beam passes through a quarter wavelength plate and an objective lens, such that the light is converged on the cantilever. The reflected light beam from the cantilever returns along the same optical path and passes through the splitter. The light beam is divided into two light beams at the splitter. These two light beams are reflected by respective prisms and are then incident on respective photodetectors. These photodetectors detect the displacement of the probe.

9 Claims, 10 Drawing Sheets

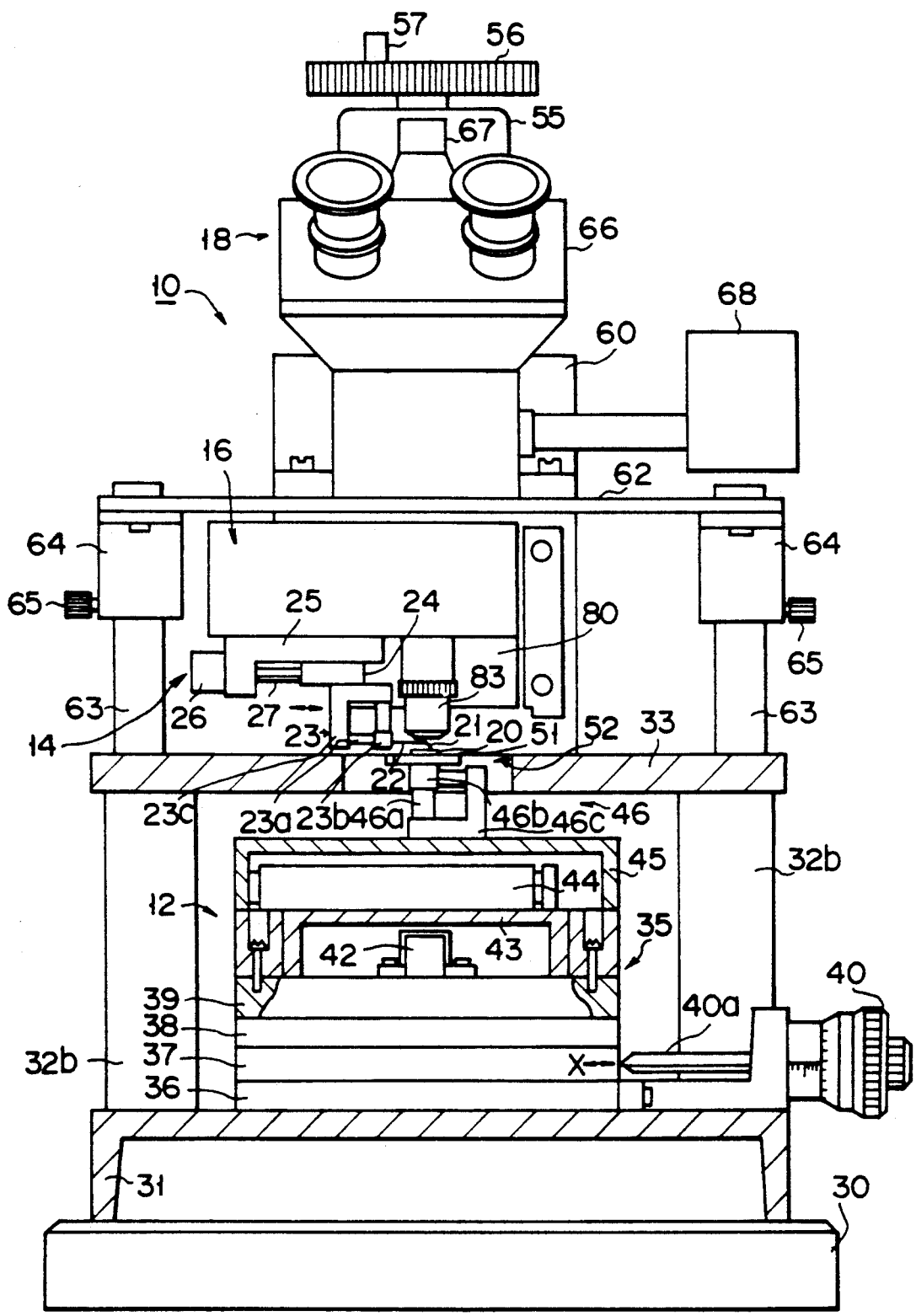
F I G. 1

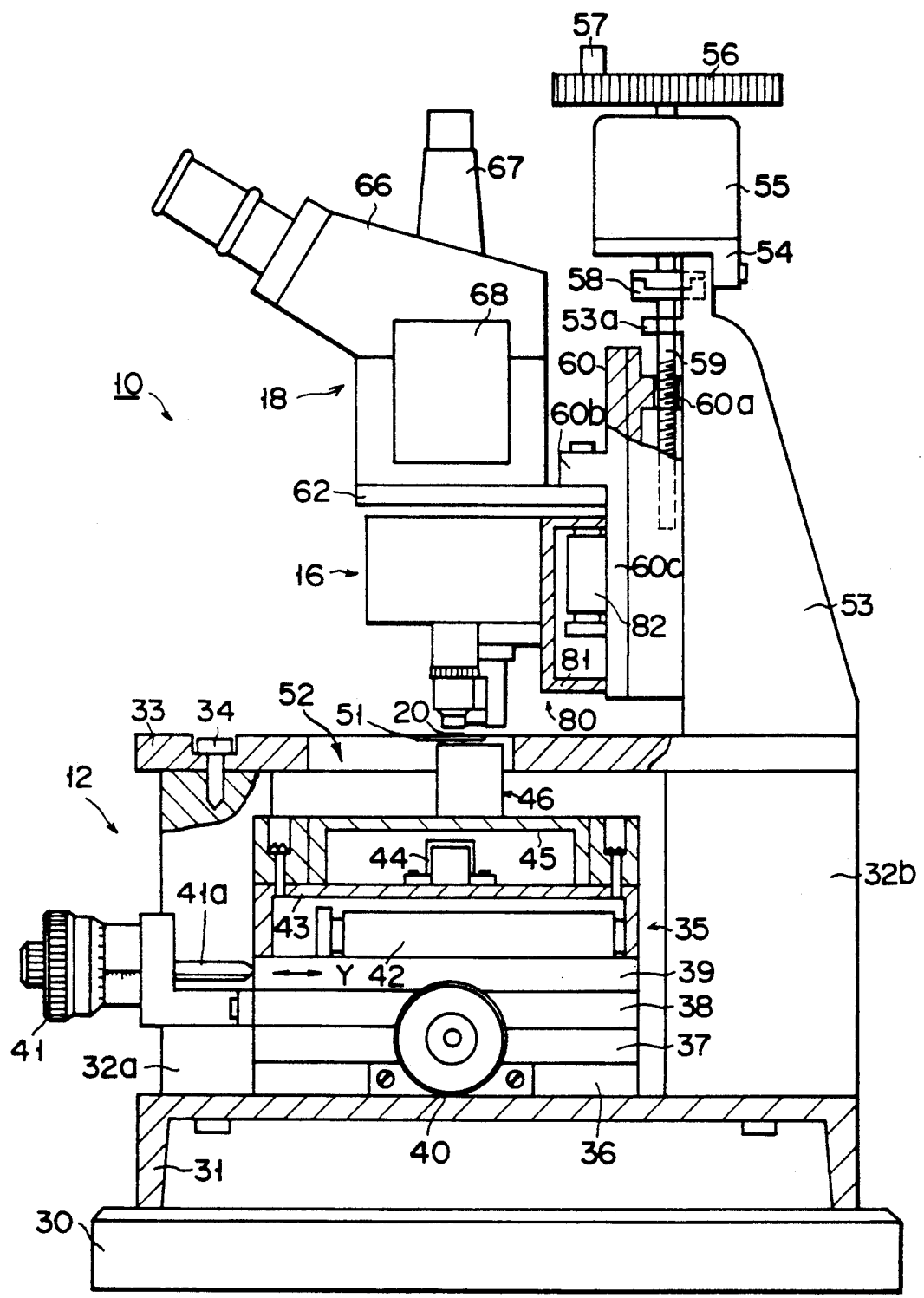
F I G. 2

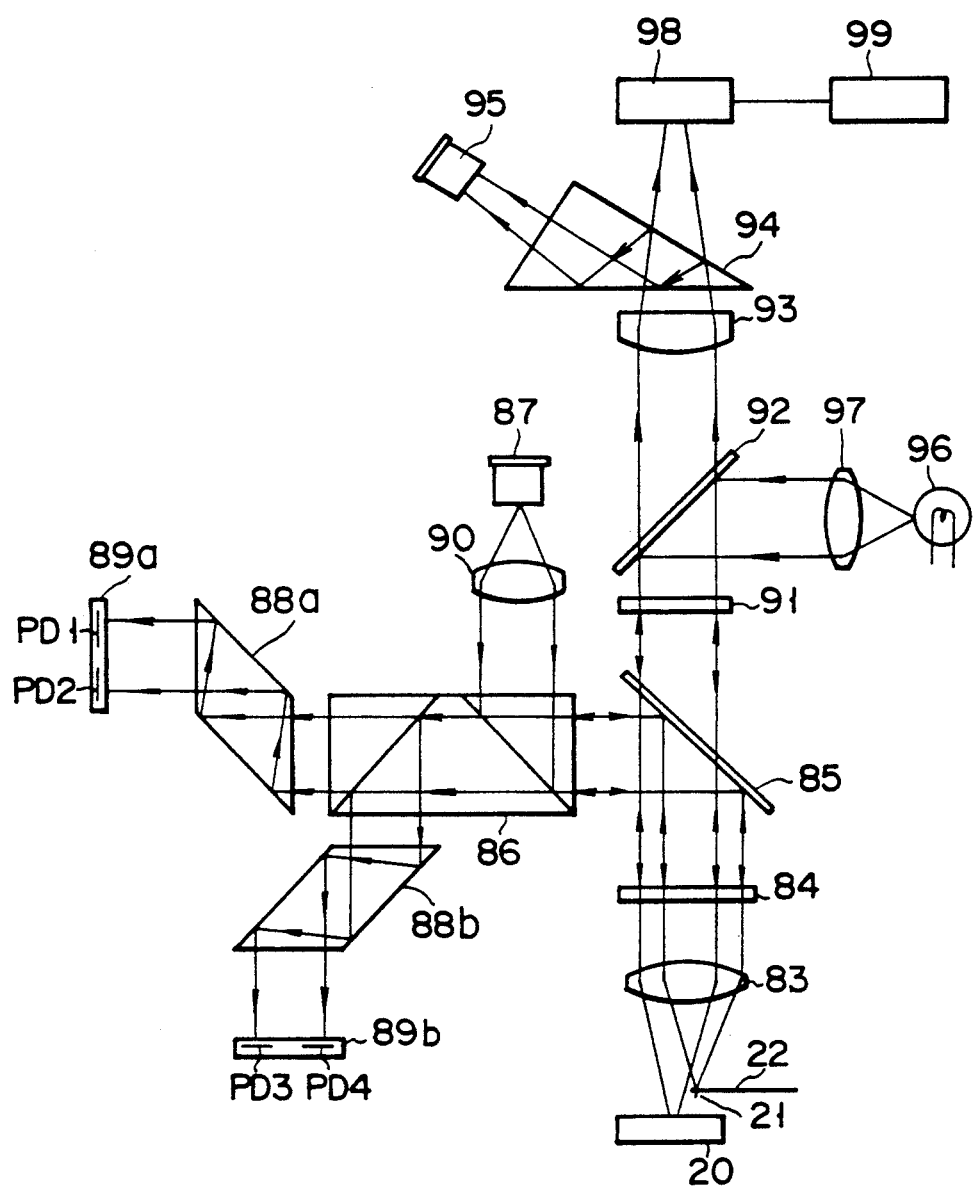
F I G. 3

ATOMIC FORCE MICROSCOPE

BACKGROUND OF THE INVENTION

1. Field of the Invention

The present invention relates to an atomic force microscope.

2. Description of the Related Art

When the pointed tip end of a probe supported on a cantilever is brought very close to the surface of a specimen, a very small attracting or repelling force acts between the atoms of the tip end of the probe and the atoms of the specimen surface. As a result of this interatomic force, the cantilever is curved or displaced, though very slightly.

An atomic force microscope which utilizes the slight displacement of the cantilever is proposed. The atomic force microscope detects the displacement of the cantilever, for the measurement of the atomic force acting between the atoms of the tip end of the probe and the atoms of the specimen surface. The atomic force microscope also allows atom-level observation of the specimen surface by scanning the specimen surface with the probe, with the interatomic force maintained at a constant value. An example of such an atomic force microscope is described in a treatise by G. Binnig, C. F. Quate, Ch. Gerber, et al. (*Physical Review Letters* Vol. LVI, No. 9 [March 1986], pp 930-933).

Known methods for detecting the displacement of the cantilever includes: a method using a scanning tunnel microscope (STM), an electrostatic capacitance method, a photo detection method, etc.

In the method using a scanning tunnel microscope, a tunnel probe is attached to one side (the obverse side) of a cantilever such that the distance between the tunnel probe and the other side (the reverse side) of the cantilever is short enough to permit a tunnel current to flow therebetween. The displacement of the cantilever is measured on the basis of variations in the tunnel current.

In the electrostatic capacitance method, a plate capacitor is formed such that its one pole plate is constituted by the reverse side of a cantilever (the reverse side being a side opposite to that where a probe is attached). The displacement of the cantilever is measured on the basis of variations in the electrostatic capacitance.

In the photo detection method, the reverse side of a cantilever is formed to have an optically-reflecting face. This optically-reflecting face is irradiated with a laser beam. A variation which the angle of reflection of the laser beam may have in accordance with the displacement of the cantilever and a variation which the interference fringe may have when the laser beam reflected by the optically-reflecting surface is returned to an interferometer, are detected. On the basis of this detection, the displacement of the cantilever is measured.

The present applicants proposed a scanning tunnel microscope combined with an optical microscope. To enable STM measurement within the vision field of the optical microscope, the scanning tunnel microscope comprises a transparent glass plate which is arranged in a plane perpendicular to the observation optical axis of the optical microscope. An STM probe is placed upright on the transparent glass plate in parallel to the observation optical axis, such that the STM probe does not block the vision field of the optical microscope.

The technique of confirming a measurement portion by use of the optical microscope is useful not only to the STM but also to the AFM.

However, if the displacement of the cantilever is detected by providing an STM on the reverse side of the cantilever, the STM largely occupies the vision field of the optical microscope. If the displacement of the cantilever is detected by use of the electrostatic capacitance method, the plate capacitor occupies a certain area of the cantilever, so that the area of the cantilever has to be increased to a certain extent. Accordingly, a large space is required in parallel to the surface of a specimen.

In summary, neither the provision of the STM nor the use of the electrostatic capacitance method is desirable for the detection of the displacement of the cantilever, since the vision field of the optical microscope is largely blocked in either way.

SUMMARY OF THE INVENTION

Accordingly, an object of the present invention is to provide an atomic force microscope enabling a measurement portion to be visually confirmed in a reliable manner by use of an optical microscope.

To achieve this object, an atomic force microscope provided by the present invention comprises:

a probe supported close to the surface of the specimen and having a tip end for producing an interatomic force with reference to the surface of the specimen;

a cantilever having a free end portion on which the probe is supported, the cantilever being elastically deformable and displacing the free end portion thereof in accordance with an interatomic force acting between an atom of the tip end of the probe and an atom of the surface of the specimen; and a detection optical system for irradiating the cantilever with detecting light, so as to detect the displacement of the cantilever.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a partially-sectional front view showing an atomic force microscope according to the first embodiment of the present invention;

FIG. 2 is a partially-sectional side view of the atomic force microscope shown in FIG. 1;

FIG. 3 is a view showing an optical system used for measurement of a probe displacement and an optical system used for observation of a specimen surface, both optical systems being incorporated in the atomic force microscope shown in FIGS. 1 and 2;

FIGS. 11A and 1B are sectional and bottom views, respectively, showing a modification of the probe-driving system employed in the atomic force microscope shown in FIGS. 1 and 2;

DETAILED DESCRIPTION OF THE PREFERRED EMBODIMENTS

Figure 4:
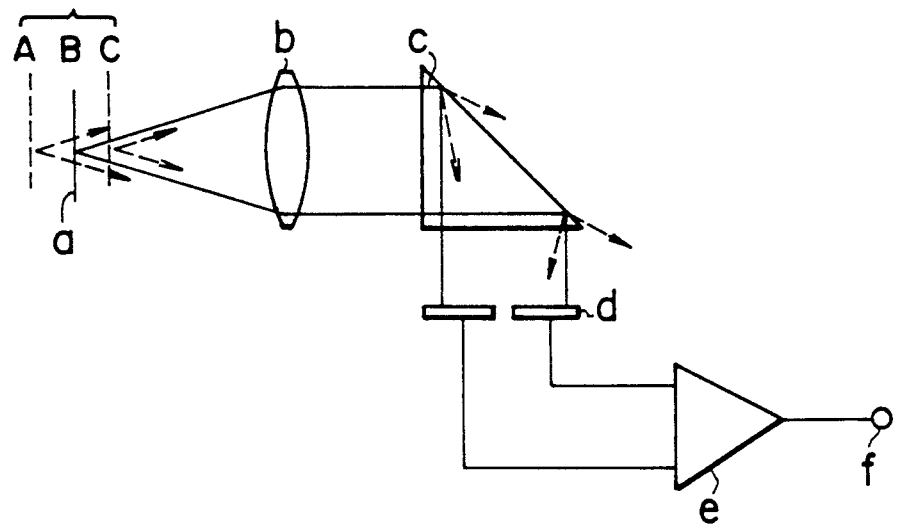
FIG. 4 is a view illustrating the critical angle method used in the probe displacement-measuring optical system shown in FIG. 3.

An atomic force microscope according to the present invention will now be described, with reference to the accompanying drawings.

Referring first to FIGS. 1 and , an apparatus 10 (i.e., a microscope) is basically provided with a specimen stage-moving mechanism 12, a probe-driving system 14, a probe displacement-measuring optical system 16, and a specimen surface-observing optical system 18. The specimen stage-moving mechanism 12 is mounted on a vibration-proof base 30 which is pressure-controlled by use of e.g. an air spring. The specimen stage-moving mechanism 12 comprises an XY stage 35. This XY stage 35 is arranged in the space which is defined by: a rectangular base member 31 placed on the vibration-proof base 30; support poles 32a, 32b standing upright on the respective corners of the base member 31; and a support base plate 33 which is fixed to the tops of the support poles 32a, 32b by means of bolts 34.

The XY stage 35 includes an X-axis base seat 36, on which a slide plate 37 for determining an X-axis position is provided such that it is slidable in an X-axis direction (which is indicated by X in FIG. 1). The XY stage 35 also includes a Y-axis base seat 38, on which a slide plate 39 for determining a Y-axis position is provided such that it is slidable in a Y-axis direction (which is indicated by Y in FIG. 2). When an X-axis operation dial 40 is rotated, an operation rod 40a is advanced or retreated by a feed screw mechanism (not shown), with the result that the slide plate 37 for determining in an X-axis position is slid for coarse adjustment. Likewise, when a Y-axis operation dial 41 is rotated, an operation rod 41a is advanced or retreated by a feed screw mechanism (not shown), with the result that the slide plate 39 for determining in a Y-axis position is slid for coarse adjustment.

A lamination-type piezoelectric actuator 42 used for a Y-axis direction scan is mounted on the slide plate 39. With a driving force produced by the actuator 42, a Y table 43 is moved for fine adjustment in the Y-axis direction along the surface of the slide plate 39. A lamination-type piezoelectric actuator 44 used for a X-axis direction scan is mounted on the Y table 43. With a driving force produced by the actuator 44, an X table 45 is moved for fine adjustment in the X-axis direction along the surface of the X table 45. The maximum distance along which the X table 45 and the Y table 43, respectively, are position-controlled is 50 $\mu$m.

A so-called tripod 46 (i.e., a fine-adjustment element), which has three lamination-type piezoelectric bodies 46a arranged perpendicular to one another, is located on the X table 45. A specimen stage 51 on which a specimen 20 is to be placed is attached to the tripod 46, with a support member 46b interposed. The three piezoelectric bodies 46a of the tripod 46 extend in the X-axis, Y-axis, and Z-directions, respectively. They are secured, at one end, to the support member 46b (which is attached to the lower side of the specimen stage 51), and are secured, at the other end, to three wall portions (which are perpendicular to one another) of the base portion 46c of the tripod 46, respectively. By use of a driving force produced by the tripod 46, the specimen stage 51 is moved relative to the X table 45 in the X-axis, Y-axis, and Z-axis directions within the range of less than 15 $\mu$m. The upper side of the specimen stage 51 is located within a hole formed in the center of the support base plate 33, and the specimen 20 is placed on the upper side of the specimen stage 51.

A column 53, having a horizontally-extending motor support plate 54 on top, is fixed to that portion of the support base plate 33 which is located above the support pole 32b. A motor 55 is fixed to the motor support plate 54, with its rotating shaft extending vertically. A manual rotation disk 56, which has an operation pin 57 projected from a circumferential portion thereof and used for coarse adjustment (i.e., fast-feed adjustment), is attached to the upwardly-projected portion of the rotating shaft of the motor 55. The downwardly-projected portion of the rotating shaft of the motor 55 extends through a friction coupling 58, is vertically held by a holding piece 53a of the column 53 in a rotatable manner, and is coupled to a shaft 59. This shaft 59 has a feed screw portion threadably engaged with the feed nut 60a of an optical system holder 60. The optical system holder 60 has a holding piece 60b attached to a proximal end portion of an optical mounting plate 62. The side portions of this mounting plate 62 are coupled to respective linear slide bearing mechanisms 64, which are provided on top of support poles 63 standing upright on the support base plate 33. Each linear slide bearing mechanism 64 comprises a case screwed on the mounting plate 62 and a slide bearing arranged inside the case. Each linear slide bearing mechanism 64 is fitted around the outer wall of the corresponding support pole 63. The lower end of each linear slide bearing mechanism 64 is fixed to the support pole 63 by means of a lock screw 65.

A specimen surface-observing optical system 18 (which includes a microscope eyepiece section 66, a video camera-mounting cylinder 67, an illuminator 68 for observation, etc.) is fixed to the upper side of the mounting plate 62. A probe displacement-measuring optical system 16 (which includes an objective lens 83) and a probe-driving system 14 are arranged below the mounting plate 62. The probe displacement-measuring optical system 16 is fixed to, and is detachable from, the mounting block 81 of a fine-adjustment driving device 80 movable along one axis. The mounting block 81 can be vertically moved by a lamination-type piezoelectric actuator 82, which is fixed to the vertical plate 60c of the optical system holder 60. Thus, the probe displacement-measuring optical system 16 can be slightly moved in the vertical direction by the lamination-type piezoelectric actuator 82.

The specimen surface-observing optical system 18 and the probe displacement-measuring optical system 16 will be described, with reference to FIG. 3.

The illuminating light emitted from the light source of the illuminator 68 is first collimated by a lens 97 and is then reflected downward by a half-mirror 92. The illuminating light reflected by the half mirror 92 passes via a filter 91, a half-mirror 85 and a quarter wavelength plate 84, and falls on an objective lens 83. With the light falling on the objective lens 83, the entire specimen 20 is illuminated. The light reflected by the specimen 20 passes via the objective lens 83, the quarter wavelength plate 84, the half-mirror 85 and the half-mirror 92, and then falls on a light-focusing lens 93. By this light-focusing lens 93, the light is made to be incident on a prism 94. Part of the light incident on the prism 94 is reflected by a surface of the prism 94, such that it enters an eyepiece 95. The remaining part of the light passes through the prism 94, so that it enters a video camera 98 incorporating a CCD element or the like. In the video camera 98 the light is converted into a video signal, and this video signal is supplied to a video monitor 99 for visualizing the video signal. Incidentally, the quarter wavelength plate 84 is slightly slanted with reference to the optical path such that the light reflected by the specimen 20 does not directly enter the specimen surface-observing optical system 18. Accordingly, the image within the field of vision is clear and free of flare.

In the meantime, the laser beam emitted from the laser diode 87 of the probe displacement-measuring optical system 16 is first collimated by a collimating lens 90 and is then incident on a polarized beam-splitter 86. The laser beam reflected by this splitter 86 is further reflected by the half-mirror 85, and is incident on the quarter wavelength plate 84. When passing through the quarter wavelength plate 84, the laser beam is converted from linearly-polarized light into circularly-polarized light. The laser beam, thus converted, is converged on the upper side of the cantilever 22 by the objective lens 83, such that the point of convergence is located at the probe 21. The laser beam reflected by the upper side of the cantilever 22 passes through the objective lens 83 and the quarter wavelength plate 84, and is reflected by the half-mirror 85 toward the polarized beam-splitter 86. When passing through the quarter wavelength plate 84, the laser beam reflected by the cantilever 22 is converted back into linearly-polarized light, such that the vibration plane of the laser beam which is output from the quarter wavelength plate 84 is rotated 90° from that of the laser beam which is input to the quarter wavelength plate 84. The laser beam reflected by the half-mirror 85 and entering the polarized beam-splitter 86 is split into two laser beams. One of these two laser beams is incident on a first two-component light-receiving element 89a after passing through a first critical angle prism 88a, while the other laser beam is incident on a second two-component light-receiving element 89b after passing through a second critical angle prism 88b.

A critical angle method is utilized for detecting the position of the cantilever 22. The principles underlying the critical angle method will be explained briefly, with reference to FIGS. 4 and 5.

In the critical angle method, a critical angle prism c is arranged such that its reflecting surface forms a critical angle with reference to the collimated light rays coming from a lens b.

Figure 5:
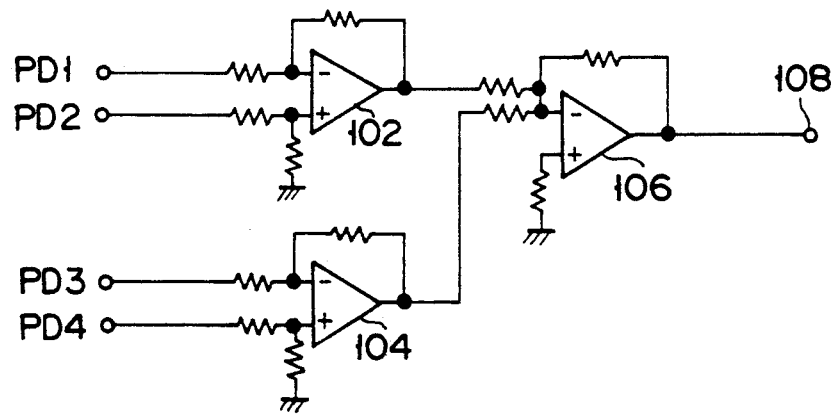
FIG. 5 is a block circuit diagram of a signal-processing circuit which is used for the critical angle method illustrated in FIG. 4.

When the reflecting surface a of a given object is located at the position indicated by solid line B in FIG. 4 (i.e., when the beam is in focus), the light beam reflected by reflecting surface a is collimated by the lens b and is then incident on the critical angle prism c. The light beam is totally reflected by the reflecting surface of the prism c, and the same amount of light is directed to each photodiode of a two-component light-receiving element.

When the reflecting surface a is located at the position indicated by broken line C in FIG. 4 (i.e., when the reflecting surface a is closer to the lens b than the focal point of the lens b), the light beam reflected by the reflecting surface a becomes a divergent light beam when passing through the lens b, and is then incident on the critical angle prism c. Conversely, when the reflecting surface a is located at the position indicated by broken line A in FIG. 4 (i.e., when the reflecting surface is more away from the lens b than the focal point of the lens b), the light beam reflected by reflecting surface a becomes a convergent light beam when passing through the lens b, and is then incident on the critical angle prism c. In either case, the light bean incident on the critical angle prism c is not a collimated light beam. Therefore, only the central rays of the light beam are incident on the prism c at the critical angle. The rays passing along one side of the central rays are incident on the prism c at an angle narrower than the critical angle, so that part of them are directed to the outside of the prism c, with the remaining part being reflected by the prism c. The rays passing along the other side of the central rays are incident on the prism c at an angle wider than the critical angle, so that they are totally reflected by the prism c. As a result, the light amount which one photodiode receives differs from the light amount which the other receives. Accordingly, a signal corresponding to the difference in the light amount is produced from an output terminal f after being amplified by a differential amplifier e. That is, the position of the reflecting surface a is detected as the light amount difference between the detecting portions of the two-component light-receiving element d.

As may be understood from the above, light beams which are incident on a critical angle prism at an angle narrower than a critical angle are partly directed toward the outside of the prism, each time they strike against reflecting surfaces. As a result, the light amount is reduced considerably. Therefore, the light amount difference between the light beams incident at an angle narrower than the critical angle and the light beams incident at an angle wider than the critical angle becomes greater, each time the light beams strike against the reflecting surfaces. In order to improve the measuring accuracy, therefore, it is desirable that the light beams be reflected by the reflecting surface of the critical angle prism a plural number of times. In the case of this embodiment, detection light is reflected twice within the critical angle prism. An output of one photodiode PD1 of the first light-receiving element is supplied to the inversion input terminal of a comparator 102, and an output of the other photodiode PD2 is supplied to the non-inversion input terminal of the same comparator 102. Thus, the comparator 102 produces a signal corresponding to the difference between the outputs of photodiodes PD1 and PD2. Likewise, an output of one photodiode PD3 of the second light-receiving element is supplied to the inversion input terminal of a comparator 104, and an output of the other photodiode PD4 is supplied to the non-inversion input terminal of the same comparator 104. Thus, the comparator 104 produces a signal corresponding to the difference between the outputs of photodiodes PD3 and photodiode PD4 is produced from the comparator 104. The signals produced from the comparators 102 and 104 are added together, and a signal obtained by this addition is supplied to one of the paired input terminals of a comparator 106, where it is compared with a reference value. A result of this comparison is output from the comparator 106. In this manner, a signal corresponding to the light amount difference between the region on one side of the beam spot on the two-component light-receiving element and the region on the other side of the beam spot (the signal represents the position of the cantilever 22) is output from a terminal 108.

Turning back to FIGS. 1 and 2, the probe-driving system 14 of the probe displacement-measuring optical system 16 is made up of: a cantilever 22 having a probe 21 thereon; a tripod 23 for slightly moving the cantilever 22; and a mechanism for inserting the cantilever 22 into the region between the objective lens 83 and the specimen 20 and for pulling the cantilever 22 out of the region. The probe 21 is located at the free end of the cantilever 22, and the other end of the cantilever 22 is supported by the support member 23b of a tripod 23 (which includes piezoelectric bodies 23a perpendicular to one another). The tripod 23 is supported, at its base portion 23c, by a member 24 slidably provided for a holder 25. The tripod 23 can be moved in the lateral direction, as viewed from FIG. 1, by a driving rod 27 moved by a pulse motor 26. With this construction, the probe 21 can be inserted into the region between the objective lens 83 and the specimen 20 or pulled out of the region.

Figure 6A:
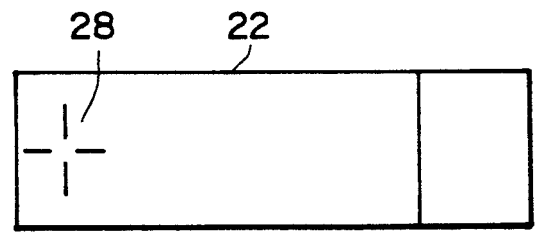
FIGS. 6A and 6B are plan and side views, respectively, of a cantilever employed in the atomic force microscope shown in FIGS. 1 and 2.
Figure 6B:
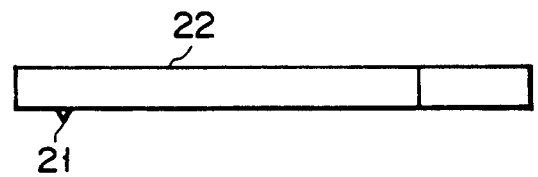

As is shown in FIGS. 6A and 6B, the cantilever 22 has a diamond or tungsten stylus on one side thereof, and this stylus serves as the probe 21 mentioned above. On the other side of the cantilever 22, a mark 28 is formed by use of lithography, so as to indicate the tip point of the probe 21.

Figure 7:
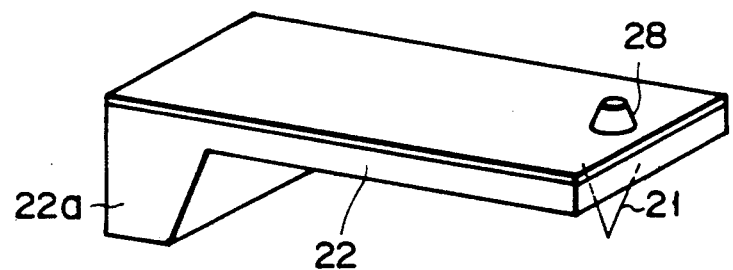
FIG. 7 is a view of another type of cantilever which can be employed in the atomic force microscope shown in FIGS. 1 and 2.

FIG. 7 shows an example of another type of cantilever which can be used in the present invention. In the case of this example, the cantilever 22 is formed of Si, and the probe 21 and the mark 28, which are on the respective sides of the free end of the cantilever 22, are formed by use of micro fabrication. The "micro fabrication" is also called micro machining or micro dynamics, and refers to the technique developed on the basis of the semiconductor device-manufacturing technology. When the term "micro fabrication" is used, it does not indicate a technique for manufacturing a purely electrical device, such as an IC, but indicates a technique for manufacturing a device of which mechanical movement is required or whose mechanical shape plays an important role. For example, the technique mentioned in Kurt E. Petersen, "Silicon As a Mechanical Material. Proceedings of the ITTT" 70(1982)420 may be regarded as micro fabrication. Anisotropic etching and isotropic etching are typical examples of major processes utilized in the micro fabrication.

The cantilever 22 employed in the atomic force microscope should be thin and light in weight, so as to make the most of the movement of the probe 21. At the same time, however, its support portion 22a should have a certain mechanical strength, for easy attachment of the cantilever 22 to the microscope or for easily replacement of the cantilever 22 with another one. To satisfy these requirements, a cantilever support plate is employed in the present invention. The thickness of this cantilever support plate is nearly equal to the thickness of an Si wafer used for the formation of the cantilever.

Figure 8A:
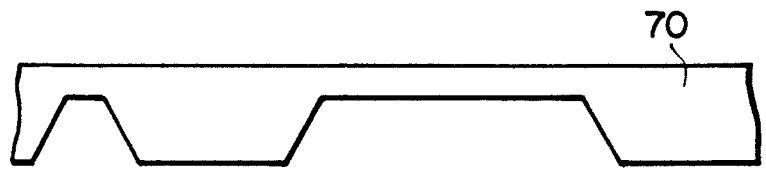
FIGS. 8A to 8C are views illustrating the process in which the cantilever shown in FIG. 7 is formed.
Figure 8B:
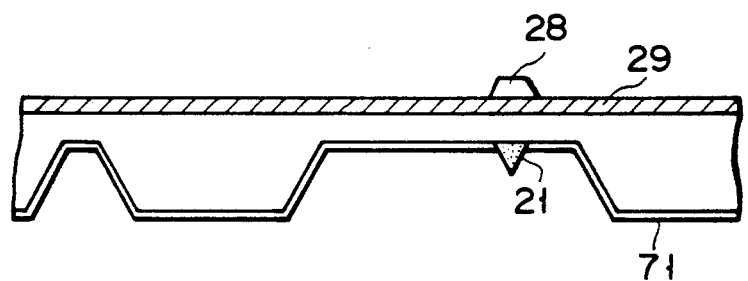
Figure 8C:
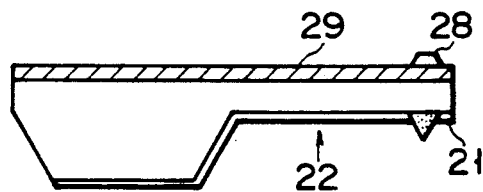

A description may now be given as to how the cantilever 22 is manufactured, with reference to FIGS. 8A to 8C. First of all, the lower side (i.e., the reverse side) of an Si wafer 70 is anisotropically etched, using $Si_3N_4$ as a mask (FIG. 8A). Next, an optical reflection film 29 is formed on the upper side of the Si wafer 70. In the meantime, the lower side of the Si wafer 70 oxidizes in the ambient atmosphere, so that an $SiO_2$ film 71 is formed on the lower side. A mark 28 and a probe 21 are formed, as explained below, on a thin portion obtained by the anisotropic etching, such that the mark 28 is on the upper side and the probe 21 is on the lower side (FIG. 8B). Finally, the Si wafer 70 is etched from the lower side by use of reactive ion plasma, to thereby cut a cantilever portion from the Si wafer 70. In this manner, the cantilever 22 shown in FIG. 7 is manufactured.

As mentioned above, the probe and the mark can be simultaneously formed in the same process. Since, therefore, the probe and the mark can be accurately aligned in the vertical direction, the cantilever is permitted to have intended dimensions. In addition, cantilevers having uniform quality can be manufactured for replacement use.

Figure 9A:
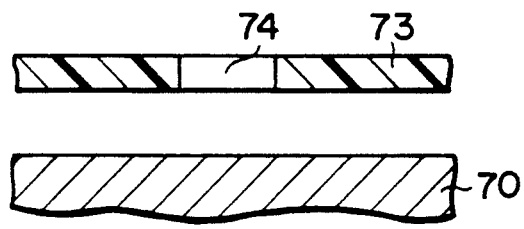
FIGS. 9A to 9C are views illustrating the process in which the probes shown in FIGS. 6B and 7 are formed.
Figure 9B:
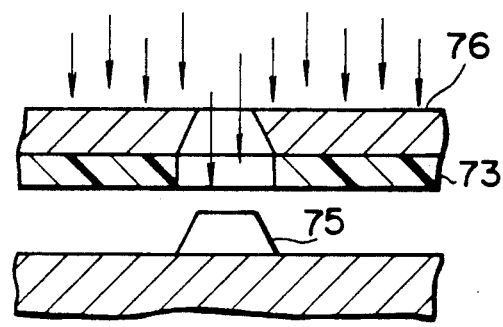
Figure 9C:
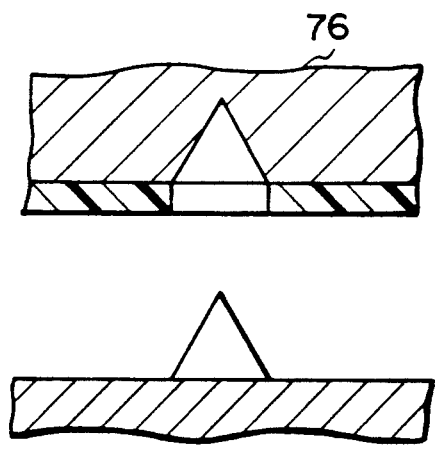

Next, a description will be given as to how the probe 21 and mark 28 are formed, with reference to FIGS. 9A to 9C. To form the probe 21 or mask 28, a mask pattern 73 having a hole 74 is prepared. This mask pattern 73 is arranged close to that side of the Si wafer 70 for which the probe 21 or mask 28 is to be formed, as is shown in FIG. 9A. Next, a conductive material is deposited over the Si wafer 70 from the direction indicated by the arrows in FIG. 9B. A mark 28 is formed on the Si wafer 70 by stopping the deposition when the conductive material 76 deposited on the Si wafer 70 is still in the shape of a truncated cone (FIG. 9B). To form the probe 21, the deposition is continued until the hole 74 is completely filled with the conductive material 76 deposited over the mask 73. By so doing, the probe 21 is formed to have a conical shape, as is shown in FIG. 9C.

The material of the cantilever is not limited to Si; it may be determined in accordance with the manner in which the microscope is used. In the above, the cantilever was described as being manufactured by the etching of the Si wafer 70. However, the base portion of the Si wafer 70 may be further etched in such a manner that the cantilever is constituted by a thin film of $SiO_2$, $Si_3N_4$, polycrystalline Si, Al, etc., which are obtained by combination of both an etching technique and a film deposition technique (such as CVD, deposition, sputtering, or the like).

Figure 10:
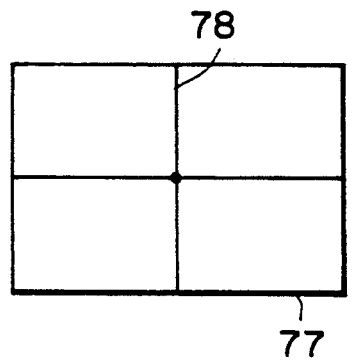
FIG. 10 is a view of the reticle used in the probe displacement-measuring optical system.

Next, a description will be given as to how a specimen is measured. First of all, the cantilever 22 is moved to the region within the visual field of the optical microscope by use of the pulse motor 26 and the tripod 23. Then, the cantilever 22 is adjusted such that its mark 28 is located in the center of the cross-shaped lines 78 of the reticle 77 (FIG. 10) of the optical microscope, and the adjusted position of the cantilever is recorded on the basis of the pulse count of the pulse motor and/or the voltage applied to the tripod 23. In the case where the video camera 98 is used, the cantilever 22 is adjusted such that its mark 28 is located in the center of the cross-shaped cursor of the video monitor 99. Then, the cantilever 22 is moved out of the visual field of the optical microscope by use of the pulse motor 26. With the specimen 20 (with reference to which the optical microscope is in focus) being observed through the eyepiece 95, the video camera 98, or the video monitor 99, the XY stage 35 is driven until a measurement portion (i.e., a portion to be measured) of the specimen 20 is located in the center of the cross-shaped lines 78 or the cross-shaped cursor. After the specimen 20 is positioned in this fashion, the tripod 46 and the specimen stage-moving mechanism 12 are kept locked until AFM measurement (i.e., measurement employing an atomic force microscope) is performed. Subsequently, by use of the pulse motor 26 and the tripod 23, the mark 28 of the cantilever 22 is adjusted again to the center of the cross-shaped lines 78, on the basis of the recorded pulse count and/or the recorded voltage. By following the above procedure, the tip end of the probe 21 of the cantilever 22 can be adjusted to the measurement portion of the specimen 20. In the AFM measurement, a two-dimensional scan is carried out by use of the tripod 23 or 46. During this two-dimensional scan, the displacement of the cantilever 22 (the displacement being caused due to the force acting between the atoms of the tip end of the probe 21 and one atom of the specimen 20) is measured by the probe displacement-measuring optical system 16. The measured displacement is shown on a CRT monitor.

Figure 11A:
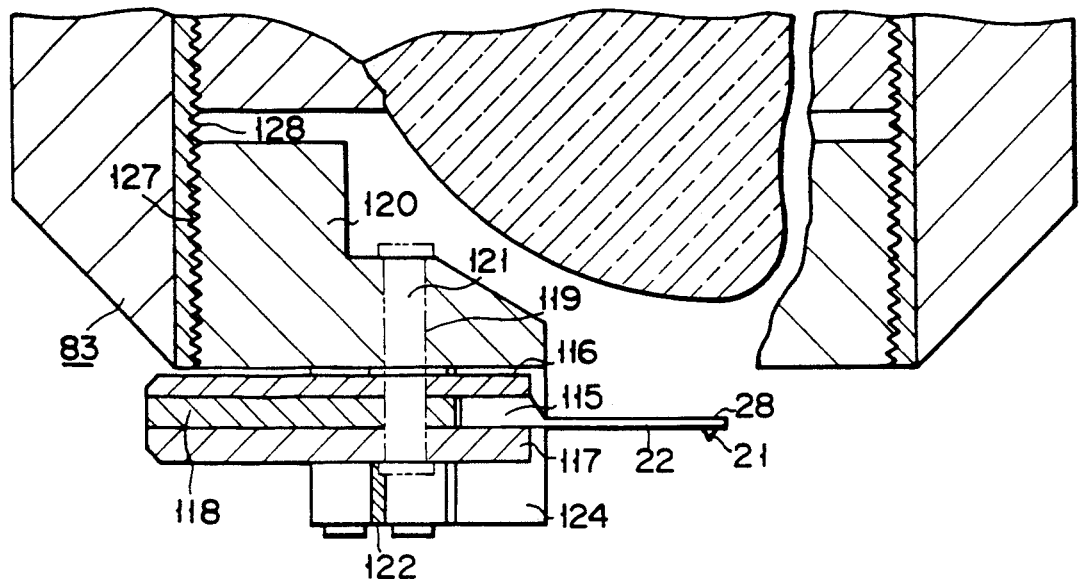
Figure 11B:
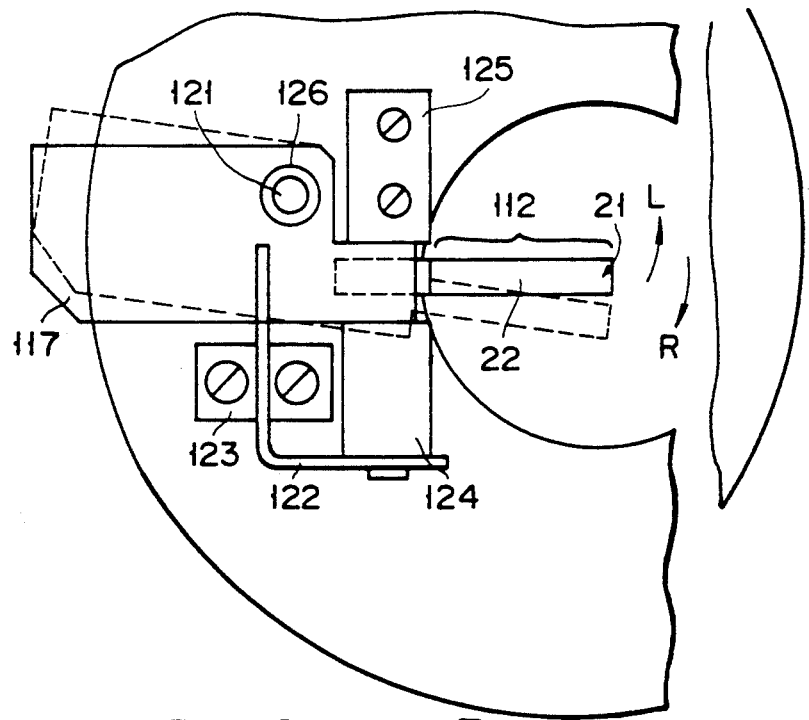

The cantilever 22 can be inserted or pulled out of the region between the objective lens 83 and the specimen 20 not only by the mechanism mentioned above but also by the mechanism shown in FIGS. 11A and 11B. Referring to FIGS. 11A and 11B, a cantilever 22 has a mark 28 and a probe 21 formed on the respective sides thereof. The cantilever 22 has a support portion 115 clamped by use of three thin plates 116, 117 and 118, and an arm portion 112 projected from the thin plates 116, 117 and 118. The thin plates 116, 117 and 118 have a common hole 119, in which a shaft 121 extending through the hole 119 of a fixed ring 120 is inserted. A slip ring 126 is fitted around the shaft 121, and this slip ring 126 supports the thin plates 116, 117 and 118 such that the cantilever 22 can be rotated. The fixed ring 120 has a spring stopper 123 for securing an L-shaped spring 122. One end of the L-shaped spring 122 abuts a stopper block 124, and the cantilever 22 is prevented from rotating beyond a certain position in the clockwise direction indicated by arrow R in FIG. 11A. The fixed ring 120 also has a positioning block 125. This positioning block 125 abuts the cantilever 22, so that the position of the cantilever 22 can be accurately determined with reference to the counterclockwise rotation (indicated by arrow L in FIG 11A) of the L-shaped spring 122. The fixed ring 120 has a male screw portion 127 extending perpendicular to the cantilever 22, and this male screw portion 127 is engageable with the female screw portion 128 of the objective lens 83. When the cantilever 22 abuts the positioning block 125, its mark 28 (FIG. 10) is located in the center of the cross-shaped lines of the reticle. The cantilever 22 of this embodiment can be easily moved out of the vision field by rotating the end portions of the thin plates 116–118 (which are located on a line extending from the support portion 115) clockwise with fingers or by use of suitable means.

Figure 12:
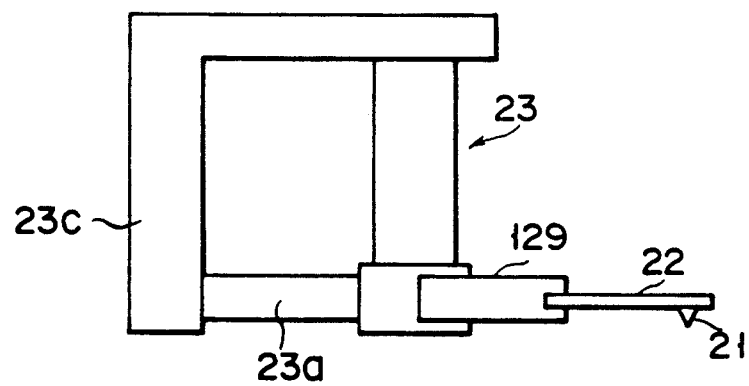
FIG. 12 is a view showing another modification of the cantilever-driving system employed in the atomic force microscope shown in FIGS. 1 and 2.

FIG. 12 shows still another mechanism which can be used for inserting the cantilever 22 into the region between the objective lens 83 and the specimen 20 or for pulling the cantilever 22 out of the region. In this mechanism, a spring 129 is located between the cantilever 22 and the tripod 23. The spring 129 is thin if viewed from above, and can be curved in the horizontal direction. Therefore, the cantilever 22 is permitted to horizontally swing, with the tripod 23 as a center. Since the spring 129 is not allowed to curve in the vertical direction, it does not have any adverse effects on the displacement of the cantilever 22. The probe 21 can be moved out of the vision field of the optical system by applying an external force to the spring 129 in the curving direction thereof by use of a suitable means (not shown). The probe 21 elastically returns to the original position by releasing the spring from the external force.

Another embodiment of the present invention will now be described, wherein a specimen can be optically observed, simultaneous with the specimen observation utilizing an interatomic force.

Figure 13:
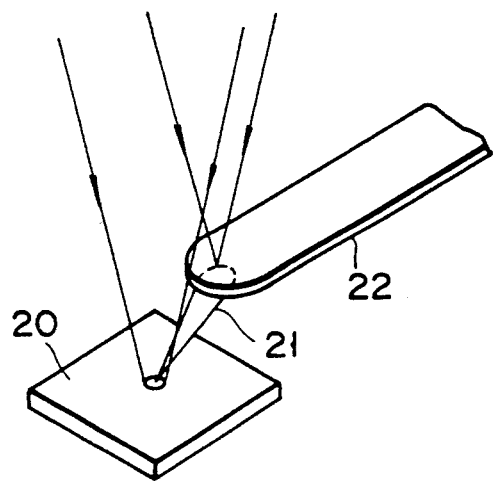
FIG. 13 is view showing one type of cantilever employed in an atomic force microscope according to the second embodiment of the present invention, the cantilever allowing not only sample observation using an interatomic force but also sample observation based on the optical principles.

The cantilever 22 and probe 21 used in this alternative embodiment are shown in FIG. 13. The cantilever 22 has a specularly-polished surface on the upper side of the distal end portion thereof. From the lower side of the distal end portion of the cantilever 22, the probe 21 extends slantwise in the downward direction such that its tip end looks projected from the distal end of the cantilever, if viewed from above. The illuminating light of the specimen surface-observing optical system 18 is made to fall on the tip end of the probe 21, while the laser beam of the probe displacement-measuring optical system 16 is made to fall on the free end portion (i.e., the distal end portion) of the cantilever 22. In other words, the optical path of the illuminating light of the optical system 18 and that of the laser beam of the optical system 16 are different. With this construction, a specimen 20 can be optically observed, simultaneous with the detection of the displacement of the probe 21.

The probe-driving system 14 of the above embodiment does not have to employ a mechanism for inserting the cantilever 22 or retracting it from the region between the objective lens 83 and the specimen 20. In the case where the probe-driving system 14 does not employ such a system, the cantilever 22 may be secured to the region near a hole 52 by use of a piezoelectric member.

The way for observing a specimen 20 will be described. The specimen 20 is first placed on the specimen stage 51, and then the specimen surface-observing optical system 18 is focused on the specimen 20 by operating the coarse-adjustment operation pin 57, the manual rotation disk 56, the motor 55, etc. Next, the displacement-measuring optical system 16 is turned on to drive the piezoelectric bodies, and is focused on the upper side of the cantilever. Subsequently, the tripod is driven, so as to move the specimen stage 51 upward. When the cantilever is displaced due to the interatomic force produced between the probe and the specimen, an output of the measuring optical system 16 slightly varies. At this point of time, the upward movement of the tripod is stopped, to thereby maintain the state wherein the cantilever is kept applied with the force arising from the interatomic force. In this state, the specimen 20 is scanned.

A signal voltage for producing reciprocating motion is applied to the X-axis direction piezoelectric body of the tripod 46, and a signal voltage for producing linear motion is applied to Y-axis direction piezoelectric body of the tripod 46. As a result of the application of these signal voltages, the specimen 20 is XY raster scanned. The measurement is continued until a predetermined region of the specimen 20 is scanned. During the scanning operation, the Z-axis direction piezoelectric body of the tripod 46 is feedback-controlled such that the inclination of the cantilever is maintained at a constant value. On the basis of the feedback signal and the XY scanning signal, a fine profile of the surface of the specimen is measured.

The probe 21 employed in the above embodiment is projected from the distal end of the cantilever 22. Therefore, the light for illuminating the vision field falls on the field under observation, without being intercepted by the cantilever 22. Accordingly, the surface profile under measurement can be optically observed while the fine surface profile of the specimen is being measured by the probe 21.

Figure 14:
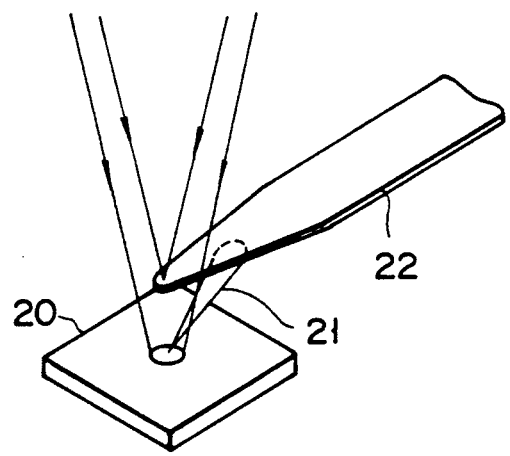
FIG. 14 is view showing another type of cantilever which can be employed in the atomic force microscope according to the second embodiment of the present invention, the cantilever allowing not only sample observation using an interatomic force but also sample observation based on the optical principles.

FIG. 14 shows another type of cantilever 22 and another type of probe 21 which can be employed in the above embodiment. To use the cantilever 22 and probe 21 shown in FIG. 14, none of the specimen stage-moving mechanism 12, the displacement-measuring optical system 16 and the specimen surface-observing optical system 18 have to be specially modified, and a fine profile of the specimen surface can be measured by following similar procedure to that mentioned above. As is shown in FIG. 14, the cantilever 22 has a tapered distal end portion. The probe 21, with which to examine the specimen surface, is supported on the lower side of the tapered distal end and extends slantwise in the downward direction. In the case of the modification shown in FIG. 14, the illuminating light of the optical system 18 and the laser beam of the optical system 16 pass along the same optical path, and the laser beam is converged on the upper side of the cantilever 22 such that the point of convergence is located just above the tip end of the probe 21. With this construction, the displacement of the distal end portion of the cantilever accurately reflects the displacement of the tip end of the probe, so that it is not necessary to perform a correcting operation. Although the illuminating light is intercepted by the distal end of the cantilever 22, an observation image can be sufficiently clear since the distal end of the cantilever 22 is tapered and has only a small area.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An atomic force microscope which allows observation of a surface of a specimen by utilization of an interatomic force, comprising:

an observation optical system including means for directing light rays to be incident on said specimen, said light rays being substantially perpendicular to the surface of said specimen which reflects at least some of said light rays, andmeans for receiving said reflected light rays to thereby enable observation of the surface of said specimen;

a probe supported close to the surface of the specimen and having a tip end so that an interatomic force is produced between an atom of the tip end thereof and an atom of the surface of the specimen;

a cantilever having a free end portion on which the probe is supported, said cantilever being elastically deformable and displacing the free end portion thereof in accordance with the interatomic force, said cantilever being positioned out of a path followed by at least some of said reflected light rays for permitting the surface of the specimen to be optically observed with said at least some reflected light rays; and a detection optical means for irradiating the cantilever with a detecting light, so as to detect a displacement of the cantilever.

2. An atomic force microscope according to claim 1, wherein said detection optical means includes:
   a light source for emitting the detecting light;
   optical means for converging the detecting light and directing the converged light to the cantilever;
   a prism which is arranged such that a central ray of the light reflected by the cantilever is incident on a reflecting surface of the prism at a critical angle; and
   a photodetector for measuring the amount of light reflected by the prism.

3. An atomic force microscope according to claim 1, wherein said cantilever has mark which is formed thereon at a position corresponding to the tip end of the probe, said atomic force microscope further comprising holding means for holding the cantilever, said holding means permitting the probe to be selectively inserted into a vision field of the observation optical field and removed from the vision field, said observation optical system having a reticle used for positioning said mark formed on the cantilever.

4. An atomic force microscope according to claim 3, wherein said free end of the cantilever has two opposed surfaces, said probe extending from one of said two opposed surfaces and said mark formed on the cantilever includes a material deposited on the other of said two opposed surfaces.

5. An atomic force microscope according to claim 1, wherein said probe protrudes from the cantilever and is inclined with reference to a direction in which said light rays of the observation optical system are transmitted, said probe also being included with reference to the surface of said specimen.

6. An atomic force microscope according to claim 5, wherein said cantilever is located at a peripheral portion of a vision field of the observation optical system.

7. An atomic force microscope according to claim 5, wherein said free end portion of the cantilever includes a tapered distal end, said observation optical system and said detection optical means having an optical path which is common to them, and wherein said at least some light rays of the observation optical system directed to the specimen and light rays of the detecting light of the detection optical means directed to the cantilever follow said optical path.

8. An atomic force microscope according to claim 1, wherein said cantilever is located with a working distance of said observation optical system and having a reflecting means on a surface thereof opposite to the surface supporting said probe, and said detection optical means having a laser source for emitting a laser beam to said reflecting means and a transmitting-reflecting means, including a half-mirror located in a path of the light rays of said observation optical system for reflecting the laser beam reflected from said reflecting means.

9. A combination of an optical microscope and an atomic force device, said device including at least a cantilever arranged within a working distance of an optical microscope having means for optically observing a sample, said device comprising:

a probe with a fine tip;

an elastic body supporting the probe, the elastic body being adapted to be displaced by an atomic force operating between atoms of the sample and the tip of said probe;

a laser beam source having means for projecting laser beams on a surface of said elastic body located in a visual field of said optical microscope;

a half-mirror, located in a light path of said optical microscope, for reflecting the laser beams reflected from the surface of said elastic body; and a displacement detector having means for detecting a displacement of said elastic body by receiving the laser beams reflected from said half-mirror.

* * * * *